US012185051B2

(12) United States Patent
Ruo

(10) Patent No.: US 12,185,051 B2
(45) Date of Patent: Dec. 31, 2024

(54) METHOD OF DETECTING EARPHONE STATE RELATIVE TO EARPHONE CASE, ELECTRONIC DEVICE, AND EARPHONE ASSEMBLY

(71) Applicant: GOERTEK INC., Weifang (CN)

(72) Inventor: Wenzhang Ruo, Weifang (CN)

(73) Assignee: GOERTEK INC., Weifang (CN)

( * ) Notice: Subject to any disclaimer, the term of this patent is extended or adjusted under 35 U.S.C. 154(b) by 531 days.

(21) Appl. No.: 17/646,785

(22) Filed: Jan. 3, 2022

(65) Prior Publication Data

US 2022/0124429 A1 Apr. 21, 2022

Related U.S. Application Data

(63) Continuation of application No. PCT/CN2019/129524, filed on Dec. 28, 2019.

(30) Foreign Application Priority Data

Nov. 28, 2019 (CN) ........................ 201911217152.6

(51) Int. Cl.
*H04R 1/10* (2006.01)

(52) U.S. Cl.
CPC ......... *H04R 1/1041* (2013.01); *H04R 1/1025* (2013.01)

(58) Field of Classification Search
CPC ............................ H04R 1/1041; H04R 1/1025
USPC ........................................................... 381/74
See application file for complete search history.

(56) References Cited

U.S. PATENT DOCUMENTS 10,582,287 B2 * 3/2020 Song ........................ E05C 19/16
2019/0297408 A1 9/2019 Mohammadi et al.

FOREIGN PATENT DOCUMENTS

| | | | | | |
|---|---|---|---|---|---|
| CN | 108566584 A | | 9/2018 | | |
| CN | 109413532 A | | 3/2019 | | |
| CN | 109511035 A | | 3/2019 | | |
| CN | 110099325 A | * | 8/2019 | ........... | H04R 1/1041 |
| CN | 110099325 B | * | 6/2020 | ........... | H04R 1/1041 |

OTHER PUBLICATIONS

First Office Action issued in corresponding Chinese Application No. 201911217152.6; mailed Aug. 19, 2020; 12 pgs.
Second Office Action issued in corresponding Chinese Application No. 201911217152.6; mailed Mar. 1, 2021; 10 pgs.
(Continued)

*Primary Examiner* — Sean H Nguyen
(74) *Attorney, Agent, or Firm* — HAUPTMAN HAM, LLP

(57) ABSTRACT

Disclosed is a method of detecting an earphone state relative to an earphone case, one of the earphone and the earphone case provides a first touch sensor, and the other of the earphone and the earphone case provides a second touch sensor and a capacitor electrically connected to the second touch sensor, the method includes: acquiring a capacitance parameter of the first touch sensor, wherein the capacitance parameter comprises a capacitance value or a capacitance change; and determining the earphone state based on the capacitance parameter, where the state comprises: the earphone in the earphone case or the earphone out of the earphone case. An device and an earphone assembly are further disclosed.

7 Claims, 10 Drawing Sheets

(56) References Cited

OTHER PUBLICATIONS

Notification of Grant issued in corresponding Chinese Application No. 201911217152.6; mailed Jun. 1, 2021; 6 pgs.
International Search Report and Written Opinion issued in corresponding International Application No. PCT/CN2019/129524; mailed Aug. 31, 2020; 11 pgs.

* cited by examiner

METHOD OF DETECTING EARPHONE STATE RELATIVE TO EARPHONE CASE, ELECTRONIC DEVICE, AND EARPHONE ASSEMBLY

CROSS-REFERENCE TO RELATED APPLICATIONS

The present disclosure is a continuation application of International Application No. PCT/CN2019/129524, filed on Dec. 28, 2019, which claims priority to Chinese Patent Application No. 201911217152.6, filed on Nov. 28, 2019, entitled "Method of detecting earphone state relative to earphone case, electronic device, and earphone assembly", the entire disclosure of which is incorporated herein by reference.

TECHNICAL FIELD

The present disclosure relates to a technical field of intelligence control, in particular to a method of detecting an earphone state relative to an earphone case, an electronic device, and an earphone assembly.

BACKGROUND

TWS (True Wireless Stereo) earphones are widely used in the art. The TWS earphones are generally small, and earphone cases are necessary to accommodate these earphones. Typically, sensor elements such as infrared sensors on a case detects the states of the TWS earphones including: earphones being taken out of the case or being put into the case. However, the infrared sensors are greatly impacted by environment, leading to inaccuracy of the state detection.

SUMMARY

The present disclosure is to provide a method of detecting an earphone state relative to an earphone case, an electronic device and an earphone assembly, to improve detection accuracy of the earphone state relative to the earphone case.

To achieve such object, the present disclosure propose a method of detecting an earphone state relative to the earphone case. The method is applied to an earphone case, the earphone case is provided with a first touch sensor, and the earphone is provided with a second touch sensor and a capacitor electrically connected to the second touch sensor; or, the method is applied to the earphone, the earphone is provided with a first touch sensor, and the earphone case is provided with a second touch sensor and a capacitor electrically connected to the second touch sensor, and the method includes the following operations:

acquiring a capacitance parameter of the first touch sensor, where the capacitance parameter includes a capacitance value or a capacitance change value; and determining the earphone state based on the capacitance parameter, where the state includes: earphone being in the earphone case or earphone being out of the earphone case.

Optionally, the capacitance parameter includes the capacitance value, and the operation of "determining the earphone state based on the capacitance parameter" includes:

in response that the capacitance value increases and is greater than a first preset capacitance value, determining that the earphone is in the earphone case; or in response that the capacitance value decreases and is smaller than a second preset capacitance value, determining that the earphone is out of the earphone case.

Optionally, the capacitance parameter includes the capacitance change value, and the operation of "determining the earphone state based on the capacitance parameter" includes:

in response that the capacitance value increases and the capacitance change value is greater than a preset change value, determining that the earphone is in the earphone case; or in response that the capacitance value decreases and the capacitance change value is greater than a preset change value, determining that the earphone is out of the earphone case, where the capacitance change value is a difference value between a currently detected capacitance value and an initial capacitance value.

Optionally, the operation of "determining the earphone state based on the capacitance parameter" includes:

in response that the capacitance value increases and is greater than a first preset capacitance value, or in response that the capacitance value increases and the capacitance change value is greater than a preset change value, detecting a connection between the earphone and the earphone case; and determining that the earphone is in the earphone case, in response to determining that the connection is on.

Optionally, the operation of "determining the earphone state based on the capacitance parameter" further includes:

in response that the capacitance value decreases and is smaller than a second preset capacitance value, or in response that the capacitance value decreases and the capacitance change value is greater than a preset change value, detecting a connection between the earphone and the earphone case; and determining that the earphone is in the earphone case, in response to determining that the connection is off.

Optionally, the operation of "detecting a connection between the earphone and the earphone case" includes:

sending a request to the earphone, in response to receiving a response to the request, determining that the earphone is successfully connected to the earphone case, where the method is applied to the earphone case; or sending a request to the earphone case, in response to receiving a response to the request, determining that the earphone is successfully connected to the earphone case, where the method is applied to the earphone.

Optionally, the operation of "detecting a connection between the earphone and the earphone case" includes:

detecting a voltage level of a charging contact in the earphone case, and in response to detecting the voltage level is at a preset state, determining that the earphone is successfully connected to the earphone case, where the method is applied to the earphone case; or detecting a voltage level of a charging contact of the earphone, and in response to detecting the voltage level is at a preset state, determining that the earphone is successfully connected to the earphone case, where the method is applied to the earphone; or Optionally, after the operation of "determining the earphone state based on the capacitance parameter", the method further includes:

in response that the earphone is in the earphone case, charging the earphone, where the method is applied to the earphone case; or in response that the earphone is in the earphone case, disconnecting the connection, where the method is applied to the earphone.

Additionally, for above object, the present disclosure further proposes an electronic device, which includes a first touch sensor, a memory, a processor, and a program for detecting an earphone state relative to an earphone case, where the memory stores the program including instructions that, when executed by the processor, cause the electronic device to execute a method as described above, and the electronic device is an earphone or the earphone case.

Additionally, for above object, the present disclosure further proposes an earphone assembly, which includes an earphone and an earphone case, where:

the earphone case has a first touch sensor, the earphone has a second touch sensor, and a capacitor electrically connected to the second touch sensor; the earphone case includes a memory, a processor and a program for detecting an earphone state relative to an earphone case, where the memory stores the program including instructions that, when executed by the processor, cause the electronic device to execute a method described above, the earphone case includes a memory, a processor and a program for detecting an earphone state relative to an earphone case, where the memory stores the program including instructions that, when executed by the processor, cause the electronic device to execute a method described above.

According to the method provided by the present disclosure, the earphone state relative to the earphone case of the earphone is detected through the capacitance change of the capacitance sensor. The capacitance will change as long as the capacitance sensors couples to each other, so that the detection sensitivity is not affected by the environment, and high detection accuracy is secured.

BRIEF DESCRIPTION OF THE DRAWINGS

In order to explain the embodiment of the present disclosure or the technical solution of the related art more clearly, the following will briefly introduce the drawings necessary in the description of the embodiments or the prior art. Obviously, the drawings in the following description are only a part of the drawings of the present disclosure. For those ordinary skilled in the art, other drawings can be obtained based on the existing drawings without any creative effort.

The implementation, functional characteristics and advantages of the present disclosure will be further described with reference to the attached drawings in combination with embodiments.

DETAILED DESCRIPTION OF THE EMBODIMENTS

As following, the technical solution in the embodiments of the present disclosure will be described clearly and completely with reference to the drawings in the embodiment of the present disclosure. Obviously, the described embodiment is only a part of the embodiment of the present disclosure, not all of the embodiments. Based on the embodiments in the present disclosure, all other embodiments perceived by those ordinary skilled in the art without creative effort should be fallen within the protection scope of the present disclosure.

Figure 1:
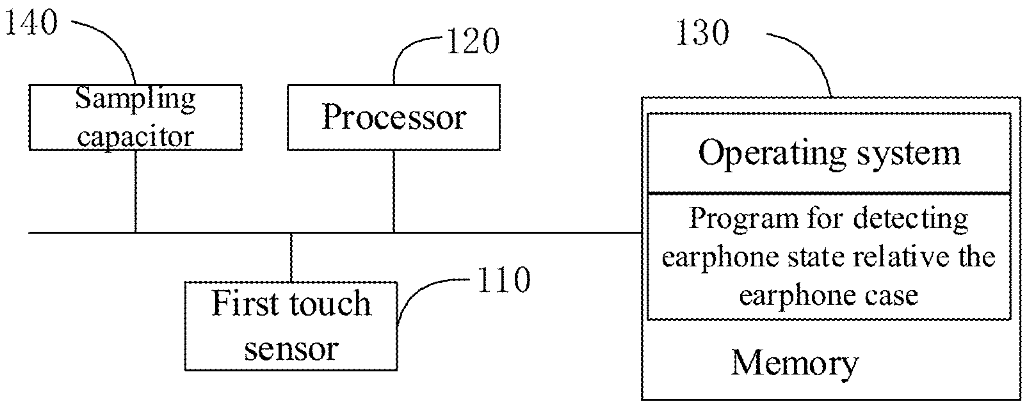
FIG. 1 is a schematic block diagram of a hardware framework regarding an electronic device involved in methods of detecting an earphone state relative to an earphone case according to the present disclosure.

FIG. 1 is referred to, which is a schematic block diagram of a hardware framework regarding an electronic device involved in a method of detecting an earphone state relative to an earphone case according to the present disclosure.

The electronic device involved in the method of detecting the earphone state relative to the earphone case in the present disclosure can be an earphone or an earphone case. The electronic device includes a first touch sensor 110, a processor 120, a memory 130, and a sampling capacitor 140. The memory 130 stores an operating system and a program for detecting the earphone state relative to the earphone case. The processor 120 detects a capacitance value of the first touch sensor 110 through the sampling capacitor 140.

When the method is applied to an earphone case, the first touch sensor is arranged in the earphone case, and is located at an inner surface of a cavity where the earphone is accommodated. And a second touch sensor and a capacitor electrically connected to the second touch sensor are arranged on the earphone. When the method is applied to the earphone, the first touch sensor is arranged in the earphone, and is positioned on a surface of the earphone. And a second touch sensor and a capacitor electrically connected to the second touch sensor are arranged in the earphone case. The second touch sensor is positioned at an inner surface of a cavity where the earphone is accommodated.

The technical solution of the method disclosed herein can be applied to earphones or earphone cases to control the earphones or earphone cases.

When the program in the memory 130 is executed by the processor, the following operations are implemented:

- acquiring a capacitance parameter of the first touch sensor, where the capacitance parameter includes a capacitance value or a capacitance change; and
- based on the capacitance parameter, a state of the earphone is determined, which is an out-box state or an in-box state.

Figure 2:
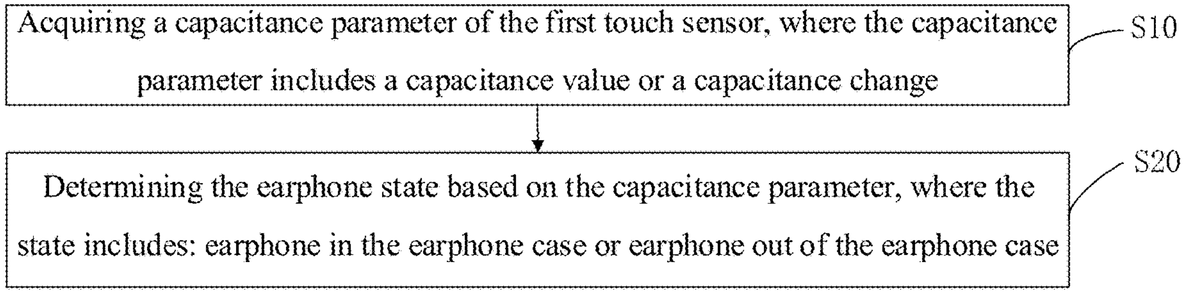
FIG. 2 is a flow chart of a method of detecting the earphone state relative to the earphone case according to a first embodiment of the present disclosure.

FIG. 2 is referred to, which is a flow chart of a method of detecting an earphone state relative to an earphone case according to a first embodiment of the present disclosure. In the present embodiment, the method is applied to an earphone case. The earphone case is provided with a first touch sensor, and the earphone is provided with a second touch sensor and a capacitor electrically connected to the second touch sensor. Or, the method is applied to the earphone, the earphone is provided with the first touch sensor, and the earphone case is provided with the second touch sensor and the capacitor electrically connected to the second touch sensor. And the method includes the following operations.

Operation S10, acquiring a capacitance parameter of the first touch sensor, where the capacitance parameter includes a capacitance value or a capacitance change.

When the method is applied to the earphone case, an MCU (Mirco Controller Unit) in the earphone case detects the capacitance parameter. A first touch sensor is arranged in the earphone case, and is located on an inner surface of a cavity where the earphone is placed; a second touch sensor and a capacitor electrically connected to the second touch sensor are arranged on the earphone. When the earphone is put into the earphone case, the first touch sensor on the earphone case is coupled with the second sensor on the earphone. As the second sensor is connected to the capacitor, the capacitance of the first touch sensor increases, and such increase is detected by the MCU in the earphone case. When the earphone is away from the earphone case, that is, when the earphone is taken out of the earphone case, the coupling between the first touch sensor and the second touch sensor disables. The capacitance of the first touch sensor detected by the MCU in the earphone case decreases.

When the method is applied to the earphone, an MCU (Mirco Controller Unit) in the earphone detects the capacitance parameter. A first touch sensor is arranged at a surface of the earphone; a second touch sensor and a capacitor electrically connected to the second touch sensor are arranged on an inner surface of a cavity where the earphone is placed. When the earphone is put into the earphone case, the first touch sensor on the earphone is coupled with the second sensor on the earphone case. As the second sensor is connected to a capacitor, the capacitance of the first touch sensor increases, and such increase is detected by the MCU in the earphone. When the earphone is away from the earphone case, that is, when the earphone is taken out of the earphone case, the coupling between the first touch sensor and the second touch sensor disables. The capacitance of the first touch sensor detected by the MCU in the earphone decreases.

Operation S20, determining an earphone state based on the capacitance parameter, where the state includes: earphone in the earphone case or earphone out of the earphone case.

In the technical solution disclosed in the present embodiment, the state of the earphone can be determined by detecting the capacitance or the capacitance change. The capacitance change is the absolute value of the difference between a capacitance value currently detected and an initial capacitance value. It will be described in detail.

Figure 5:
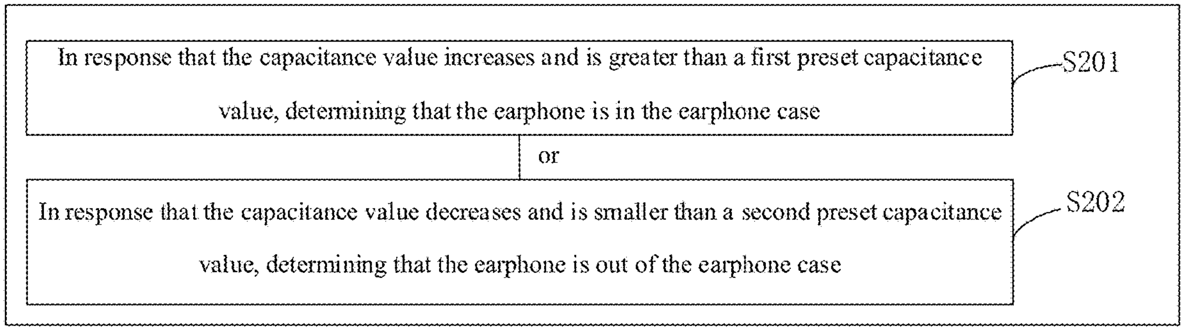
FIG. 5 is a flow chart of a method of detecting the earphone state relative to the earphone case according to another embodiment of the present disclosure.

Method one: the state of the earphone is determined by the capacitance value, referring to FIG. 5, where operation S20 includes:

Operation S201, when the capacitance value increases and is greater than a first preset capacitance value, determining that the earphone is in the earphone case; and Operation S202, when the capacitance value decreases and is smaller than a second preset capacitance value, determining that the earphone is out of the earphone case.

In the present embodiment, the first preset capacitance value can be determined by the capacitance value C0 of the first touch sensor and the capacitance value C1 of the capacitor which is connected in series with the second touch sensor. The first capacitance value can be C0+C1−K, where K is a constant which is set by developer as required, while the second preset capacitance value can be determined based on the capacitance value C0 of the first touch sensor. For example, the second preset capacitance value can be C0+H, where H is another constant which is set by the developer as required. The first preset capacitance value and the second preset capacitance value can be stored in the earphone case or earphone to determine the state of the earphone.

Figure 6:
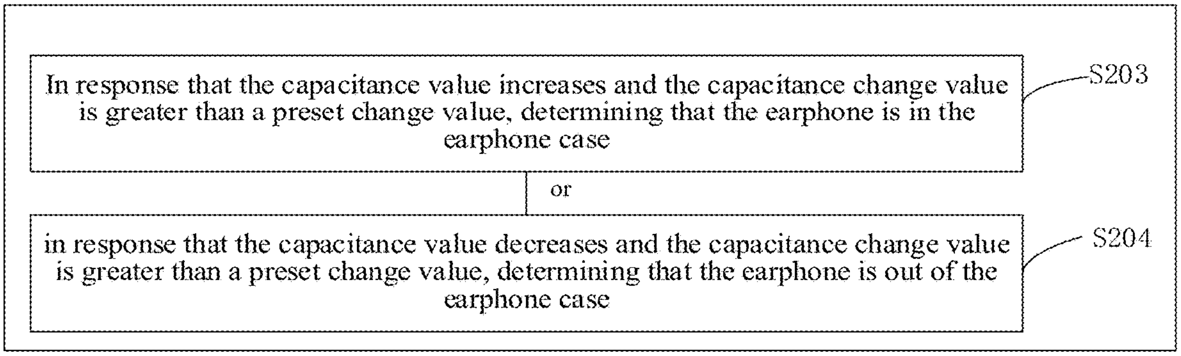
FIG. 6 is a flow chart of a method of detecting the earphone state relative to the earphone case according to another embodiment of the present disclosure.

Method two: the state of the earphone is determined by the capacitance change, referring to FIG. 6, where operation S20 includes:

Operation S203, when the capacitance value increases and a capacitance change value is greater than a preset change value, determining that the earphone is in the earphone case, where the capacitance change value is a difference value between a currently detected capacitance value and an initial capacitance value; and Operation S204, when the capacitance value decreases and s capacitance change value is greater than a preset change value, determining that the earphone is out of the earphone case.

The capacitance change can be determined based on the capacitance value C1 of the capacitor connected in series with the second touch sensor. That is, the capacitance change can be C1−M, where M is a constant which can be set by developers as required, and M is less than C1. On condition that the earphone keeps approaching the earphone case, as the first touch sensor is coupled with the second touch sensor and the second touch sensor is connected to a capacitor in series, the capacitance of the first touch sensor detected by the MCU keeps increasing from an original capacitance C0. That is, the earphone should be in the earphone case when the capacitance value reaches its largest value (the capacitance change value is also the largest). Similarly, when the earphone is taken away from the earphone case, the capacitance of the first touch sensor detected by the MCU decreases continuously, until the coupling between the first touch sensor and the second touch sensor disables. As such, the capacitance value of the first touch sensor detected by the MCU is the smallest, that is, the capacitance change value is also the largest.

According to the present embodiment, the earphone state relative to the earphone case of the earphone is detected through the capacitance change of the capacitance sensor. The capacitance will change as long as the capacitance sensors couples to each other, so that the detection sensitivity is not affected by the environment, and high detection accuracy is secured.

Figure 7:
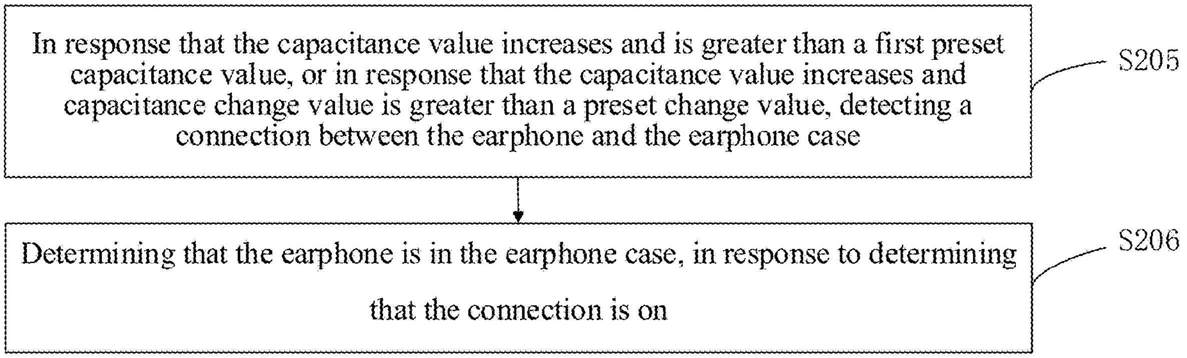
FIG. 7 is a flow chart of a method of detecting the earphone state relative to the earphone case according to another embodiment of the present disclosure.

Furthermore, based on the first embodiment, a second embodiment of the method is proposed. In the second embodiment, referring to FIG. 7, the method further includes:

Operation S205, in response that the capacitance value increases and is greater than a first preset capacitance value, or in response that the capacitance value increases and a capacitance change value is greater than a preset change value, detecting a connection between the earphone and the earphone case; and Operation S206, determining that the earphone is in the earphone case, upon determining that the connection is on.

Figure 8:
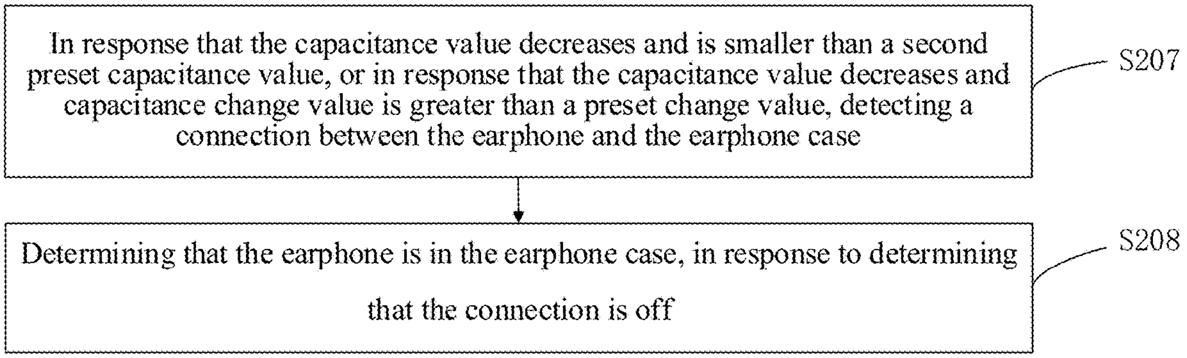
FIG. 8 is a flow chart of a method of detecting the earphone state relative to the earphone case according to another embodiment of the present disclosure.

It can be appreciated that when determining whether the earphone is out of the box based on the capacitance, the connection information between the earphone and the earphone case can be further referred to. As such, referring to FIG. 8, the method further includes:

Operation S207, in response that the capacitance value decreases and is smaller than a second preset capacitance value, or in response that the capacitance value decreases and a capacitance change value is greater than a preset change value, detecting a connection between the earphone and the earphone case; and Operation S208, determining that the earphone is in the earphone case, upon determining that the connection is off.

The connection can be detected in many ways between the earphone and the earphone case.

Method one, the connection with the earphone case can be detected through communication pins.

Figure 9:
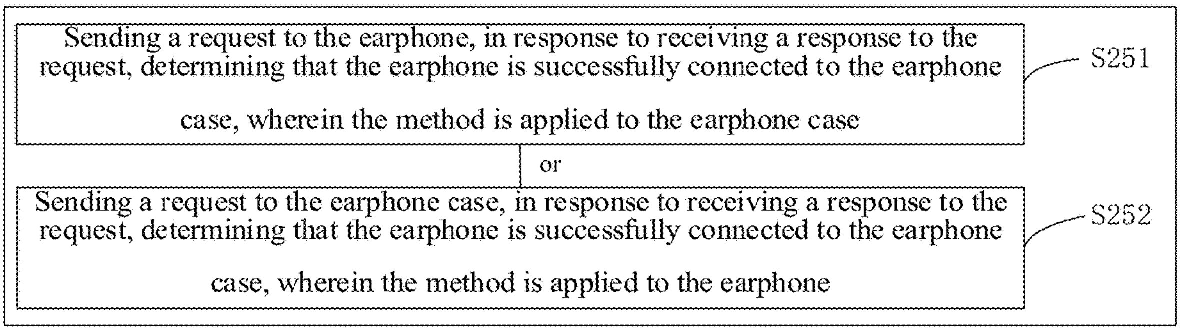
FIG. 9 is a flow chart of a method of detecting the earphone state relative to the earphone case according to another embodiment of the present disclosure.

Communication pins are typically set in both of the earphone and earphone case. After the earphone is correctly placed in the earphone case, the communication pins between the earphone and the earphone case will be communicated. As such, whether the earphone factually be placed in and out of the earphone case can be further judged through the communication of the communication pins. As such, misoperation can be avoided. Referring to FIG. 9, the operation of detecting the connection between the earphone and the earphone case includes:

Operation S251, sending a request to the earphone, upon receiving a response to the request, determining that the earphone is successfully connected to the earphone case, where the method is applied to the earphone case; or Operation S252, sending a request to the earphone case, upon receiving a response to the request, determining that the earphone is successfully connected to the earphone case, where the method is applied to the earphone.

The method of detecting the earphone state relative to the earphone case is applied to the earphone case as an example. As the principle applied to the earphone is the same, which would be omitted for conciseness. When the earphone case is opened, it sends request information to the earphone. For example, the request information can be a message and the response information can be an ACK characters for confirmation. After the earphone receives the message, it checks the received message. If no error is found, it sends the ACK characters to the earphone case for confirmation, indicating that the information has been correctly received. That is, it is determined that the earphone and earphone case are successfully connected.

Figure 10:
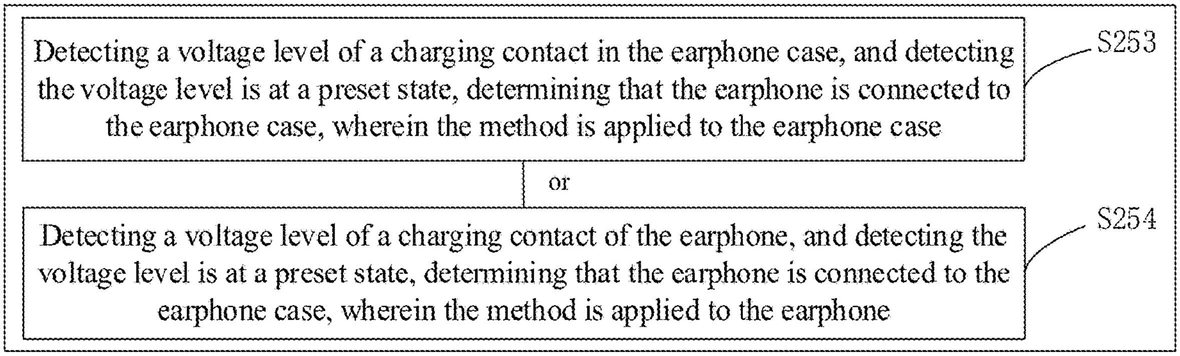
FIG. 10 is a flow chart of a method of detecting the earphone state relative to the earphone case according to another embodiment of the present disclosure.

Method two, referring to FIG. 10, the connection can be detected through charging contacts.

Operation S253, detecting a voltage level of a charging contact in the earphone case, and upon detecting that the voltage level is at a preset state, determining that the earphone is successfully connected to the earphone case, where the method is applied to the earphone case; or Operation S254, detecting a voltage level of a charging contact of the earphone, and upon detecting that the voltage level is at a preset state, determining that the earphone is successfully connected to the earphone case, where the method is applied to the earphone.

The earphone is provided with a charging contact, and the earphone case is also provided with a charging contact. After the charging contact of the earphone and the charging contact in the earphone case are electrically connected, the earphone case is able to charge the earphone. Generally, when the charging contact of the earphone and the charging contact in the earphone case are not connected, the charging contact in the earphone case is at a high-level state, and the earphone and the earphone case are in a state of unconnected or failed connection. After the charging contacts of earphone and earphone case are conducted, the charging contact of earphone case turns into a low-level state. Therefore, it is possible to detect whether the earphone is successfully connected to earphone case by detecting the voltage level state of the charging contact of earphone case. That is, when the voltage level state is low, it is determined that the earphone is successfully connected to the earphone case, and when the voltage level state is high, it is determined that the connection between the earphone and the earphone case fails. In the present embodiment, the low-level state is considered as being preset. It can be appreciated that the preset state can also be the high-level state, which only needs to be realized via a different circuit form. The technical principle of detecting the voltage level state of the charging contact of the earphone is the same as described above, and will not be repeated herein.

In the technical solution disclosed in the third embodiment, based on detecting capacitance to detect the earphone state relative to the earphone case, the earphone state relative to the earphone case is further determined by a connection state between the earphone and the earphone case. As such, the detection accuracy of earphone state is further improved.

Figure 3:
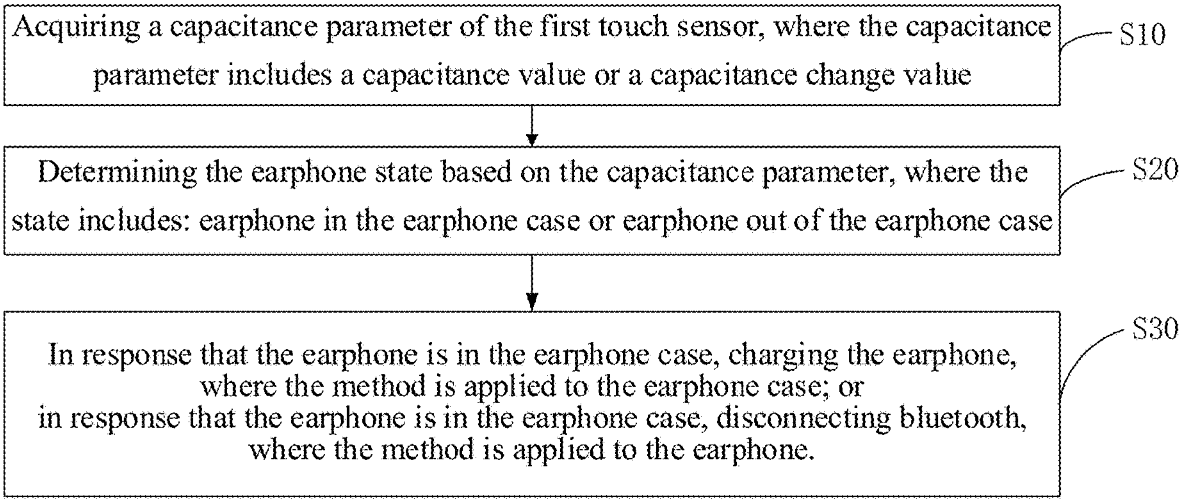
FIG. 3 is a flow chart of a method of detecting the earphone state relative to the earphone case according to a third embodiment of the present disclosure.

Referring to FIG. 3, based on the first or second embodiment, a third embodiment of the method is proposed. In the third embodiment, after operation S20, the method further includes:

Operation S30:

when the earphone is in the earphone case, charging the earphone, where the method is applied to the earphone case; or when the earphone is in the earphone case, disconnecting bluetooth, where the method is applied to the earphone.

Charging the earphone or not can be realized by a charging switch. When the earphone is in the earphone case, the charging circuit can be turned on by controlling the charging switch. When the earphone is detected to be taken out of the earphone case, the charging circuit can also be turned off by controlling the charging switch. When the earphone is in the earphone case, it indicates that the earphone is not in use, so bluetooth of the earphone can be disconnected to reduce the energy consumption of the earphone. Similarly, when the earphone is detected to be taken out of the earphone case, the bluetooth connection of the earphone can be restored, or bluetooth devices can be searched again for connection.

The present disclosure is not limited to the above mentioned controlling method when the earphone state relative to the earphone case is changed. For example, when the earphone is in the earphone case, communication between the earphone case and the earphone can also be established, and no specific example is given herein.

According to the technical solution disclosed in the present embodiment, the earphone case or earphone is further treated when the earphone is in the earphone case, and the intelligence of the earphone case or the earphone is improved.

Figure 4:
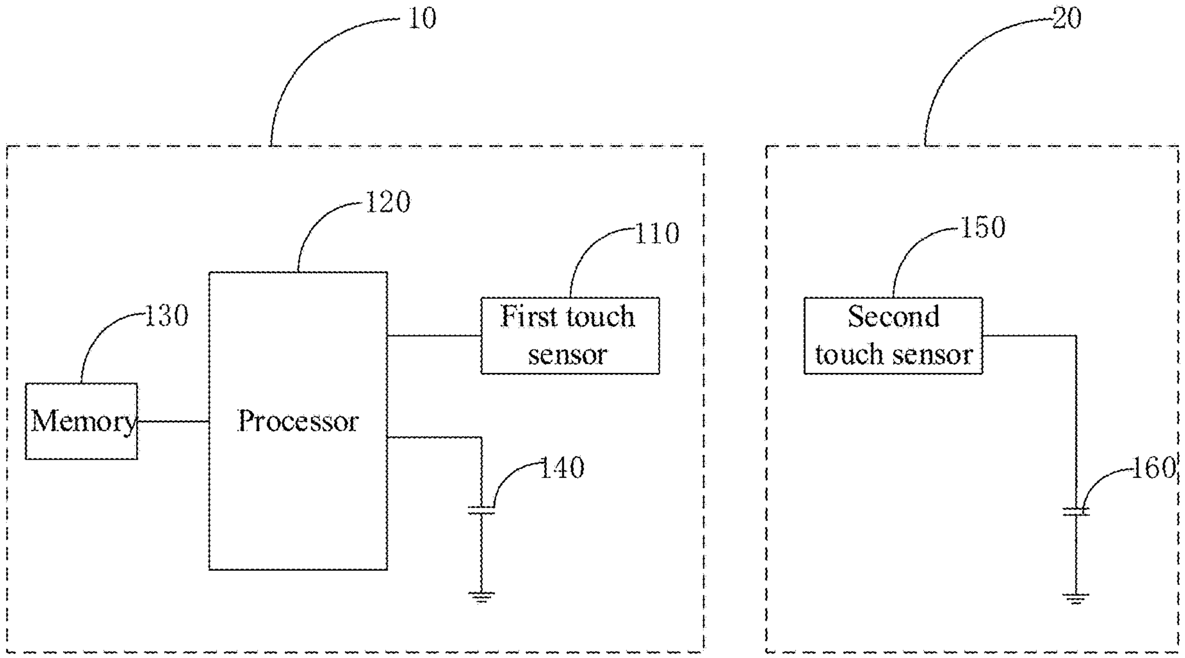
FIG. 4 is a schematic circuit of an earphone assembly involved in the methods of detecting the earphone state relative to the earphone case according to an embodiment of the present disclosure.

Referring to FIG. 4, which is a schematic circuit of an earphone assembly involved in the method of detecting the earphone state relative to the earphone case according to an embodiment of the present disclosure. In the present embodiment, the earphone assembly includes an earphone and an earphone case, where:

a first touch sensor 110 is arranged in the earphone case 10, a second touch sensor 150 is arranged on the earphone 20, and a capacitor 160 electrically connected to the second touch sensor 150 is arranged on the earphone 20. The earphone case 10 includes a first memory 130, a first processor 120 and a program stored in the first memory 130 and executable on the processor 120. When the program is executed by the processor, the operations as described above is implemented; or a first touch sensor 110 is arranged in the earphone 20, a second touch sensor 150 is arranged on the earphone case 10, and a capacitor 160 electrically connected to the second touch sensor 150 is arranged on the earphone case 10. The earphone 20 includes a first memory 130, a first processor 120 and a program stored in the first memory 130 and executable on the processor 120. When the program is executed by the processor, the operations as described above is implemented.

Referring to FIG. 4, a sampling capacitor 140 is arranged in the earphone case 10 to detect the capacitance of the first touch sensor 110. After detecting the capacitance of the first touch sensor 110 through the sampling capacitor 140, the processor 120 compares a value of the collected capacitance of the first touch sensor 110 to a first preset capacitance value and a second preset capacitance value. Or it is obtained an absolute value of a difference between the value of the collected capacitance and an initial capacitance value. The state of the earphone 20 is determined based on the absolute value. According to FIG. 4, the solution can be slightly adjusted. The first touch sensor and the sampling capacitor are arranged in the earphone, and the second touch sensor is arranged in the earphone case, which will not be repeated herein.

In the specification, each embodiment is described in a parallel or a progressive manner, and each embodiment focuses on the differences compared to other embodiments. The identical or similar parts between the embodiments can be mutually referred. The devices disclosed in the embodiment are correspondent to the methods disclosed above, therefore the description thereof is relatively simple compared as the description of the methods, the description regarding the methods can be referred to for the corresponding devices.

The ordinary skilled in the art should also appreciate that the units and algorithm operations of each example described in the embodiments herein can be implemented in electronic hardware, computer software or their combination. In order to explicitly clarify the interchangeability of hardware and software, the components and operations regarding each example have been generally described according to their functions. Whether these functions are implemented in hardware or software depends on the specific application and design constraints of the technical solution. The ordinary skilled in the art can adjust operations described in the embodiments above when applying these operations to different cases, and such application should not be considered as going beyond the scope of the present disclosure.

The operations of a method or algorithm described in the embodiments herein can be directly implemented by hardware, a software module executed by a processor, or a combination thereof. The software module can be placed in random access memory (RAM), memory, read-only memory (ROM), electrically programmable ROM, electrically erasable programmable ROM, register, hard disk, removable magnetic disk, CD-ROM, or any other form of storage medium known in the technical field.

It should also be noted that in this paper, relative terms such as "first" and "second" are used only to distinguish one entity or operation from another entity or operation, and do not necessarily require or imply any such actual relationship or order between these entities or operations. Additionally, the terms "comprising", "including" or any other variants thereof are intended to cover a non-exclusive inclusion, such that a process, method, article, or system that includes a list of elements includes not only those elements but also other elements not expressly listed, or elements inherent to such process, method, article, or device. Without further restrictions, an element defined by the statement "includes an" does not exclude the presence of another identical element in a process, method, article, or device including the element.

What is claimed is:

1. A method of detecting an earphone state relative to an earphone case, wherein:

the method is applied to the earphone case, the earphone case is provided with a first touch sensor, and the earphone is provided with a second touch sensor and a capacitor electrically connected to the second touch sensor; or, the method is applied to the earphone, the earphone is provided with a first touch sensor, and the earphone case is provided with a second touch sensor and a capacitor electrically connected to the second touch sensor, and the method comprises:

acquiring a capacitance parameter of the first touch sensor, wherein the capacitance parameters comprise a capacitance value or a capacitance change value; and determining the earphone state based on the capacitance parameter, wherein the determining the earphone state based on the capacitance parameter comprises:

in response to that the capacitance value decreases and is smaller than a preset capacitance value, or in response to that the capacitance value decreases and the capacitance change value is greater than a preset change value, determining that the earphone is out of the earphone case, and detecting a connection between the earphone and the earphone case; and determining that the earphone is out of the earphone case, in response to determining that the connection is off;

wherein the earphone state comprises: the earphone being in the earphone case or the earphone being out of the earphone case; and the capacitance change value is an absolute value of a difference between a capacitance value currently detected and an initial capacitance value.

2. The method of claim 1, wherein the operation of "determining the earphone state based on the capacitance parameter" comprises:

in response that the capacitance value increases and is greater than a first preset capacitance value, or in response that the capacitance value increases and the capacitance change value is greater than a preset change value, determining that the earphone is in the earphone case, and detecting a connection between the earphone and the earphone case; and determining that the earphone is in the earphone case, in response to determining that the connection is on.

3. The method of claim 1, wherein the operation of "detecting a connection between the earphone and the earphone case" comprises:

sending a request to the earphone, in response to receiving a response to the request, determining that the earphone is successfully connected to the earphone case, wherein the method is applied to the earphone case; or sending a request to the earphone case, in response to receiving a response to the request, determining that the earphone is successfully connected to the earphone case, wherein the method is applied to the earphone.

4. The method of claim 1, wherein the operation of "detecting a connection between the earphone and the earphone case" comprises:

detecting a voltage level of a charging contact of the earphone case, and upon detecting that the voltage level is at a preset state, determining that the earphone is connected to the earphone case, wherein the method is applied to the earphone case; or detecting a voltage level of a charging contact of the earphone, and upon detecting that the voltage level is at a preset state, determining that the earphone is connected to the earphone case, wherein the method is applied to the earphone.

5. The method of claim 1, wherein after the operation of "determining the earphone state based on the capacitance parameter", the method further comprises:

in response that the earphone is in the earphone case, charging the earphone, wherein the method is applied to the earphone case; or in response that the earphone is in the earphone case, disconnecting bluetooth, wherein the method is applied to the earphone.

6. An electronic device, comprising a first touch sensor, a memory, a processor, and a program for detecting an earphone state relative to an earphone case, wherein the memory stores the program including instructions that, when executed by the processor, cause the electronic device to execute the method according to claim 1.

7. An earphone assembly, comprising an earphone and an earphone case, wherein:

one of the earphone and the earphone case has a first touch sensor, the other of the earphone and the earphone case has a second touch sensor and a capacitor electrically connected to the second touch sensor; the one of the earphone case and the earphone case comprises a memory, a processor and a program for detecting an earphone state relative to an earphone case, wherein the memory stores the program including instructions that, when executed by the processor, cause the electronic device to execute the method according to claim 1.

* * * * *